Feb. 6, 1968 R. O. DAVIS 3,367,575

ACTUATOR

Filed Nov. 19, 1965

INVENTOR
Richard O. Davis

BY *[signature]*
ATTORNEY

# United States Patent Office 3,367,575
Patented Feb. 6, 1968

3,367,575
ACTUATOR
Richard O. Davis, Delaware County, Ohio, assignor to Ranco Incorporated, Columbus, Ohio, a corporation of Ohio
Filed Nov. 19, 1965, Ser. No. 508,802
9 Claims. (Cl. 236—100)

ABSTRACT OF THE DISCLOSURE

An actuator including a body having a cavity therein for the reception of a thermally expansible substance, a flexible, thin walled diaphragm extending across the cavity having a central portion forming a concave, constant radius spherical section, a plunger having a lubricous end part in engagement with the spherical section and in full surface contact therewith when the diaphragm is relaxed, and a plastically flowable guide for the plunger positioned in the body and in compressive engagement with the diaphragm.

---

The present invention relates to an actuating device having a part which moves in response to changes in pressure of a fluid which fluid is contained at least in part by an elastomeric diaphragm which moves a plunger or the like in response to changes in volume of the fluid.

Actuators of the type mentioned are desirable as they are relatively small, composed of few parts and can be manufactured relatively inexpensively. Heretofore, however, actuators of the type mentioned have not been suitable for many uses because the relatively high pressures applied to the elastomeric member result in stretching and flowing thereof, which produce internal frictions giving rise to undesirable hysteresis in the movement of the plunger, that is to say, the difference between the pressure of the fluid to cause a given outward movement of the plunger and the pressure of the fluid at which the plunger retracts is too great for many applications. Also, the use of elastomeric materials along with the relatively small areas of parts subjected to the fluid pressure contributed to "sponginess" of the plunger, i.e., the plunger could be depressed by the addition of external force while the fluid pressure is maintained.

Accordingly, a principal object of the present invention is the provision of a new and improved actuating device utilizing a resilient or elastomer type diaphragm through which fluid forces are transmitted to a plunger or the like and which has structural features which minimize hysteresis in the operation of the actuating device and in which the position of the plunger is uneffected by appreciable changes in external loading thereof.

Another object is the provision of a new and improved actuator utilizing an elastomeric diaphragm for transmitting fluid actuating forces to a plunger, the portion of the diaphragm contacting the plunger being in the form of a shallow spherical section in surface engagement with a similarly shaped end portion of the plunger and containing the diaphragm so that changes in fluid force on the diaphragm do not effect appreciable flowing or stretching of the diaphragm throughout its range of movement.

Another object is the provision of a new and improved actuator of the type mentioned in the preceding object wherein the ratio of the maximum diametrical extent of the spherical section of the diaphragm and the end of the plunger engaged therewith to the radius of curvature of the spherical section of the diaphragm is at least 1.14:1.

A further object of the invention is the provision of a new and improved actuator utilizing an elastomeric diaphragm for transmitting fluid forces to a movable part engaged thereby and which is confined about its area of engagement with the movable part by a flowable retaining member which forms a guide wall for the movable part and which part is incompressible relative to the retaining member whereby the retaining member fills all voids which might otherwise be subject to filling by the elastomeric material of the diaphragm.

Other objects and advantages of the invention will be apparent from the following description of a preferred embodiment thereof reference being made to the accompanying drawings wherein.

Figure 1:
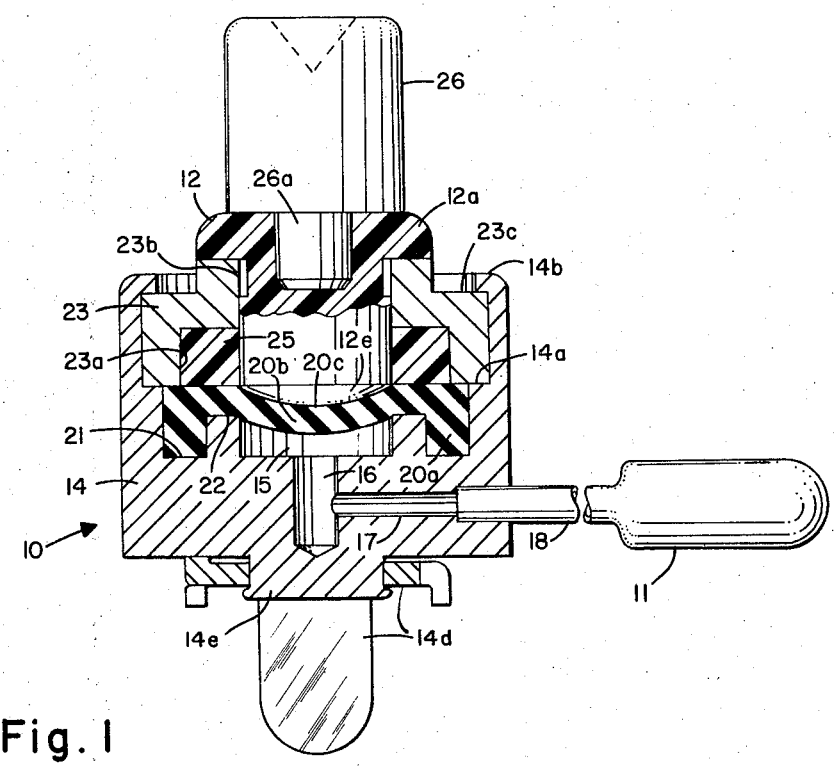
FIG. 1 is a sectional view of an actuator device embodying the invention.

Referring to the drawings, a temperature responsive actuator 10 is shown comprising a plunger 12 movable in response to changes in a fluid volume resulting from temperature change at a bulb 11. The actuator may be assembled in any suitable control device or indicator mechanism to furnish movement according to changes in temperatures at the bulb. The actuator could also be utilized to transmit movement through a hydraulic coupling with another like actuator according to movements imparted to one plunger which are desired to be transmitted to the plunger of the other actuator.

The actuator shown comprises a cylindrical body member 14 which may be formed of brass having a bored cavity in the upper side thereof forming a chamber 15 in communication with the bulb 11 through an axial bore 16, a cross bore 17 and a capillary tube 18 brazed in the bore 17.

Figure 2:
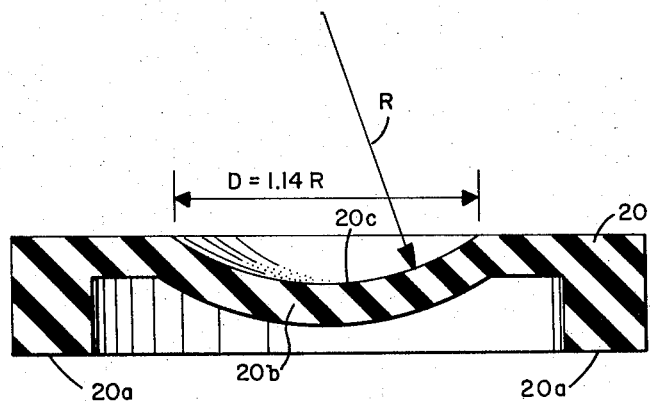
FIG. 2 is a sectional view of a resilient diaphragm forming part of the actuator shown in FIG. 1.

The open side of the cavity 15 is closed by an elastomeric diaphragm 20 which is circular and has a downwardly extending peripheral flange 20a which is closely received in an annular groove 21 formed about the cavity 15 and spaced therefrom by an annular ridge or shoulder 22. The diaphragm 20 is preferably formed of butyl or other like resilient material having good liquid sealing or containing properties, and the portion thereof lying within the annular shoulder 22 has a relatively thin wall which is in the form of a spherical section. Preferably, the diametrical extent of the plunger 12 which engages the diaphragm is at least 1.14 times the radius of curvature of the spherical section of the diaphram, this ratio being illustrated in FIG. 2 in which D, the diameter of the end of the plunger engaging the diaphragm is 1.14 times R, the radius of the spherical section. The wall thickness of the spherical section of the diaphragm is about .03 inch.

The diaphragm 20 is retained in sealing engagement with the walls of the groove 21 and the shoulder 22 by a stainless steel retainer 23 which has a cylindrical wall section 23a, the end of which rests on the peripheral portion of the diaphragm 20 and the adjoining annular face 14a of the body 14. The retainer 23 has a reduced diameter cylindrical portion 23b which forms an upper guide for the plunger 12 and an annular abutment 23c against which the top edge of a cylindrical portion of 14b of the body is rolled to firmly secure the retainer 23 in place.

An annular retainer ring 25 overlies the portion of the diaphragm 20 supported on the shoulder 22 and is firmly pressed in place by the retainer 23 which closely receives the ring within the cylindrical walls 23a of the retainer 23.

The ring 25 is preferably formed of a low friction material which has the capacity to flow under continued pressure, such as polytetrafluoroethylene or Nylatron which is a combination of nylon and molybdenum disulphide, and the inner cylindrical surface thereof forms a lower guide for the plunger 12. The ring 25 provides low friction for the plunger 12 which is preferably formed of a low friction material which is somewhat harder than the material of the ring so that the ring tends to flow and form a perfect seal with the surfaces of the plunger and thereby prevent creeping flow of the material of the diaphragm 20 between the ring and plunger. Preferably, the material forming the plunger is polyformaldehyde, commercially known as Delrin.

The end 12c of the plunger 12 is in the form of a spherical section having the same radius as the spherical section of the upper surface of the diaphragm section 20c. Furthermore, the plunger 12 has a flange 12a at its upper end which overlies the upper end edges of the retainer 23, and the central portion of the plunger is recessed to receive the stem 26a of a metallic plunger insert 26 which provides a hard surface for engaging the device to be operated by the actuator 10. The flange 12a engages the top edge of the retainer 23 to limit the inward movement of the plunger 12 to the normal position of the diaphragm 20.

The bulb 11, capillary tube 18 and the cavity 15 including bores 16, 17 are filled with suitable liquid, such as ethylene glycol and water, in such volume that when the temperature at the bulb is at or below that which is to affect the device operated by the actuator 10, the diaphragm section 20b will be relaxed. As the temperature increases at the bulb, the volume of liquid therein increases and the diaphragm section 20b tends to move upwardly and toward a flattened position thereby moving the plunger 12 upwardly. Preferably, the volume of the liquid in the bulb is such, however, that the diaphragm section 20b will not be moved through a plane and will always retain a spherical sectional form throughout its operating range, that is to say, the spherical section is preferably never moved through center. The condition mentioned can be maintained by determining the stroke required of the actuator plunger 12 and then designing the form of the lower end 12c of the plunger in accordance with the ratio of 1.14 to 1 when comparing the radius of the spherical section to the diameter of the plunger.

The actuator 10 is attached to the device it is to actuate by a bracket 14d which is secured to a headed stud 14e formed on the bottom of the body and which bracket may be bent to properly receive it to the device.

In operation, referring to FIG. 1 the plunger 12 of actuator 10 is in the position of minimum extension with flange 12a of the plunger in abutting engagement with an end 23b of the retainer 23, as ambient bulb temperatures increase the temperature of the liquid contained in the bulb increases causing the liquid to expand. An increase in pressure resulting from this expansion is communicated through capillary tube 15 and flow passages 17, 16 into the chamber 15 where the liquid pressure will act on the diaphragm 20b. The spherical section 20b of the diaphragm is forced upwardly by the liquid pressure and causes plunger 12 to move axially upwardly and actuate the device to which it is operatively connected. As the plunger 12 moves, the spherical section formed by the central portion 20b of the diaphragm flexes in an upward direction, the diaphragm is completely restrained from flowing and internal compressive forces are created in the spherical section which act with a minimum of internal friction to return the diaphragm section to its normal position when the liquid pressure decreases. By operating the diaphragm in a range in which it never reverses its spherical sectional form, as shown, little if any internal friction is developed and the hysteresis of the actuator is exceedingly low and in fact is comparable to that of a metallic bellows. By confining the butyl material by the somewhat pliable material of the retainer 25, the butyl cannot flow or stretch. This obviates internal friction apt to effect the movement of the diaphragm so that its action on the plunger corresponds closely to the pressure or volume of the thermally responsive liquid.

It should be apparent from the foregoing description that an actuator has been provided in which an elastomeric diaphragm is used to transmit liquid pressure forces to a movable plunger and in which the diaphragm is generally under compression at all times during operation of the actuator and that stretching and localized bulging of the diaphragm material has been avoided so that the movement of the actuator plunger is in accordance with the changes in liquid volume.

While but one form of the invention has been shown and described, it is to be understood that other forms, modifications and adaptations could be embodied and it is intended to cover all such forms, modifications and adaptations falling within the scope of the claims which follow.

I claim:
1. An actuator adapted to convert changes in volume of a fluid into linear mechanical movement and comprising a rigid base member having a cavity therein, said cavity providing a circular opening in said base member, an elastomeric diaphragm extending across said opening and including a portion extending beyond an edge of said opening, means for securing said portion of said diaphragm to said base member to form a liquid seal between said base member and said portion, said diaphragm including a thin walled flexible part extending over said opening, said part normally having the form of a shallow, substantially constant radius of curvature spherical section terminating at the edge of said opening and projecting into said cavity to form an outwardly facing concave surface, and a plunger having an end in engagement with said part, said end including a convex surface portion having the same dimensions as said outwardly facing concave surface, said diaphragm part and said plunger being in full surface contact, said cavity being adapted to contain a fluid communicating with said part whereby an increase in volume of said fluid will flex said part to move said plunger.

2. An actuator adapted to convert changes in volume of a fluid into linear mechanical movement and comprising a rigid base member having a cavity therein, said cavity providing a circular opening in said base member, an elastomeric diaphragm extending across said opening and including a portion extending beyond an edge of said opening, means for securing said portion of said diaphragm to said base member to form a liquid seal between said base member and said portion, said diaphragm including a thin walled flexible part extending over said opening, said part normally having the form of a shallow, substantially constant radius of curvature spherical section and projecting into said cavity to form an outwardly facing concave surface, and a plunger having an end in engagement with said part, said end including a convex surface portion having the same dimensions as said outwardly facing concave surface, said diaphragm part and said plunger being in full surface contact, said cavity being adapted to contain a fluid communicating with said part whereby an increase in volume of said fluid will flex said part to move said plunger, said plunger being constructed of a rigid lubricous material, and the surfaces of said diaphragm and said plunger sliding unrestrictingly relative to each other as said plunger is moved by said diaphragm.

3. The actuator of claim 2 wherein said lubricous material is polyformaldehyde.

4. The actuator of claim 2 wherein said securing means includes a plastically flowable annular member, said member being constructed of a lubricous material and including a first part for engaging and positioning said diaphragm on said base member and a second part snugly engaging said plunger and forming a low friction guide surface upon which said plunger moves.

5. The actuator of claim 4 wherein said member is composed of polytetrafluoroethylene.

6. An actuator of the type defined by claim 1 wherein said means securing said diaphragm to said body member comprises an annular member having an inner peripheral opening in registration with a circular edge of said spherical section of said diaphragm and forming a guide for said plunger.

7. The actuator of claim 1 wherein the diametrical extent of said end of said plunger corresponds to the diametrical extent of said spherical section of said diaphragm.

8. The actuator of claim 1 wherein the diametrical extent of said end of said plunger is no less than 1.14 times the radius of curvature of said end of said plunger and said spherical section of said diaphragm.

9. The actuator of claim 1 including means for limiting movement of said plunger into said base member and defining a retracted plunger position and wherein said spherical section of said diaphragm is in a relaxed condition when said plunger is in said retracted position.

References Cited
UNITED STATES PATENTS

| | | | |
|---|---|---|---|
| 2,694,415 | 11/1954 | Dillon | 236—100 X |
| 2,843,151 | 7/1958 | Greenawalt. | |
| 2,873,609 | 2/1959 | Von Wangenheim | 73—368.3 |

EDGAR W. GEOGHEGAN, *Primary Examiner.*